United States Patent [19]
Perlo et al.

[11] Patent Number: 5,829,856
[45] Date of Patent: Nov. 3, 1998

[54] DEVICES WITH MICRO-FILTERS FOR SELECTION OF COLORS AND IMAGES

[75] Inventors: Piero Perlo, Sommariva Bosco; Piermario Repetto, Turin; Sabino Sinesi, Piossasco, all of Italy

[73] Assignee: C.R.F. Societa Consortile per Azioni, Turin, Italy

[21] Appl. No.: 825,089

[22] Filed: Mar. 27, 1997

[30] Foreign Application Priority Data

Mar. 27, 1996 [IT] Italy ............................. TO96 A 000236

[51] Int. Cl.[6] ............................................... G03B 21/14
[52] U.S. Cl. ................................................ 353/84; 353/38
[58] Field of Search ........................ 353/38, 84; 362/293, 362/309; 345/32, 88; 359/589, 590, 578, 891; 349/106

[56] References Cited

U.S. PATENT DOCUMENTS

| | | | |
|---|---|---|---|
| 3,597,069 | 8/1971 | Heinoneu, Jr. ............................ | 353/84 |
| 4,294,524 | 10/1981 | Stolov ...................................... | 353/84 |
| 4,924,356 | 5/1990 | French et al. ........................... | 362/293 |
| 5,285,298 | 2/1994 | Kaneko et al. .......................... | 353/84 |
| 5,623,349 | 4/1997 | Clarke .................................... | 349/8 |

*Primary Examiner*—William Dowling
*Attorney, Agent, or Firm*—Sughrue, Mion, Zinn, Macpeak & Seas, PLLC

[57] ABSTRACT

The radiation beam emitted by a polychromatic source of finite dimension is initially corrected in its vergency and distribution by a reflector or a system which operates according to refraction, diffraction or total inner reflection effects. The beam then strikes on an array of micro-lenses of square or rectangular shape of arbitrary cross-section which have the function to converge and divide the beam into a plurality of partial beams which may have different directions, towards a matrix of colored micro-filters or images.

14 Claims, 6 Drawing Sheets

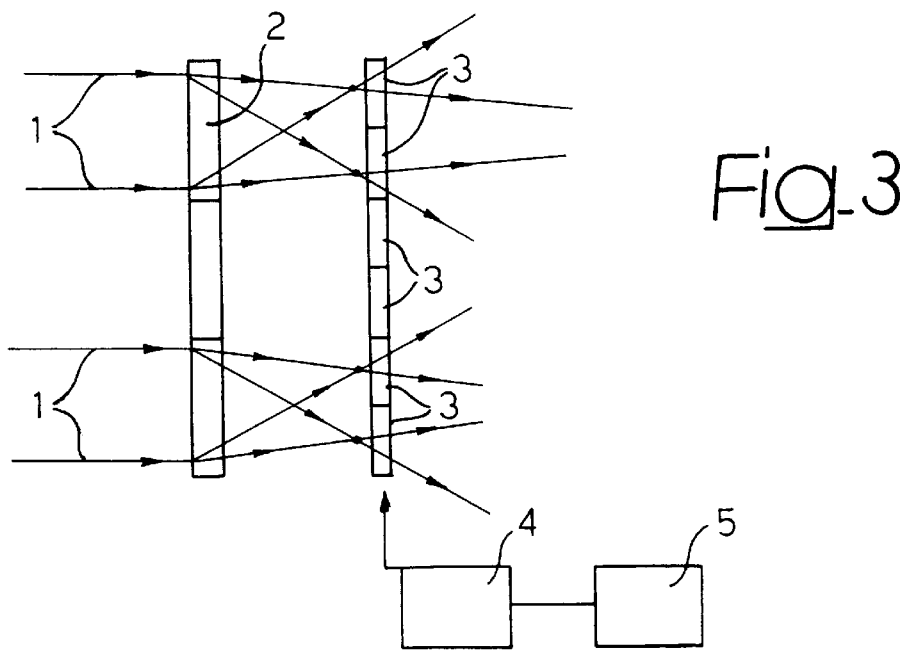
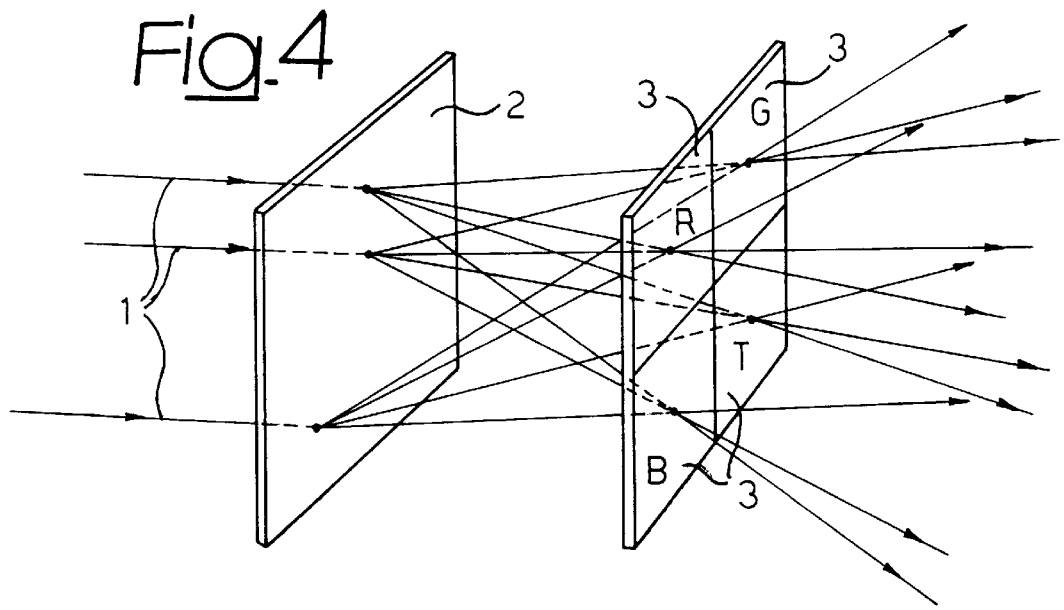
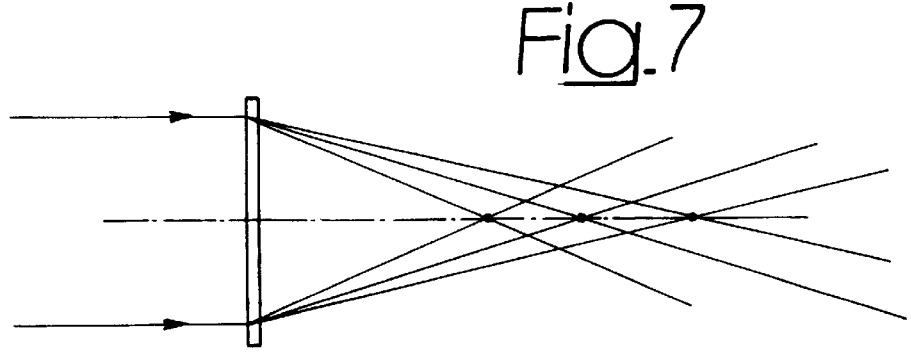

DEVICES WITH MICRO-FILTERS FOR SELECTION OF COLORS AND IMAGES

BACKGROUND OF THE INVENTION

The present invention relates to the field of optical devices which can be used for selecting colours or images in a polychromatic light beam.

The selection of colour in a polychromatic light beam was always the subject of study by the experts of illumination or optics. The most known method consists in arranging coloured filters on the path of the light beam. To this end, the filters are usually arranged on a rotating disk A (FIGS. 1A, 1B) driven by an electric motor B and including a plurality of sectors $C_1, C_2, C_3, \ldots C_n$ constituted by filters of different colours. In another known solution, the colour is selected by using a liquid crystal system C controlled by an electronic control device D. This type of colour selection is efficient, does not require moving parts and may be applied, as also in the case of FIGS. 1A, 1B, both in displaying and in projecting images. The solution of FIG. 2, however, implies the use of expensive materials, not so much available on the market, and a sophisticated control electronics and finally requires high investments for its industrial exploitation.

In the field of devices for displaying images or static signals, the conventional technique usually consists in illuminating uniformly a symbol formed with various means on a transparent plate. In this manner, in order to provide different signals, it is necessary to provide a symbol for each signal. Thus, for example, the warning lights used on board motor-vehicles require the provision of a light source for each symbol.

Another known method consists in using mirrors able to select the colour, for example using multi-layered optical coatings, diffraction gratings or prismatic effects of combinations thereof.

In the field of devices for displaying dynamic images, matrices of cells are used, each of which may change its state, for example by liquid crystals with polarizing filters or micro-mirrors. In all cases making use of liquid crystals, diffusers and polarizing filters, there is the problem that one can not define a narrow viewing window. This aspect is sometimes advantageous, since it allows observation even at great angles, but many other times it is instead disadvantageous, since the images are visible also from position from which they should not be visible.

In the field of devices for projecting static images, according to the prior art, a diapositive is uniformity illuminated by a polychromatic beam and an objective projects the image on a screen. Each time that one wishes to change the image it is necessary to replace the diapositive.

SUMMARY OF THE INVENTION

The object of the present invention is that of overcoming the problems of the prior art which has been described above, in particular by providing for many different images to be seen at different angles or projected simultaneously with different angles on different screens, the whole with relatively simple means and using conventional materials and low cost technologies.

In view of achieving this object, the invention provides a device for the selection of colours or images in a light beam, wherein it comprises a light beam generator, an array of micro-lenses integrated in a thin and transparent plate, each able to generate one or more partial beams, an array of coloured micro-filters or image micro-cells having size and cross-section adapted to the size and the cross-section of said micro-lenses, an actuating device to apply a relative movement between the two arrays of micro-filters or micro-filters or image micro-cells, so as to obtain a luminous pattern at the output, which is selected among various possible patterns different in shape and/or colour and/or vergency.

BRIEF DESCRIPTION OF THE DRAWINGS

The invention will be now described with reference to the annexed drawings, given purely by way of non limiting example, in which:

FIGS. 3, 4 show a diagrammatic side view and a partial perspective view of a device according to the invention using a micro-lens matrix and a coloured filter matrix, with reference to an example in which for each micro-lens there is provided a matrix of four micro-filters, three of which are of red, green and blue, and the fourth is transparent; the distance between the micro-filters and the micro-lens is such that the partial polychromatic beam generated by each micro-lens intercepts a single micro-filter, FIG. 7 is a diagrammatic side view of the multi-focal lens of FIG. 5, 6 which shows the three focuses on the optical axis of this micro-lens.

DETAILED DESCRIPTION OF THE INVENTION

Figure 1A:
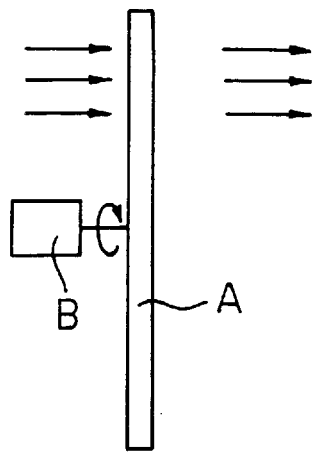
FIG. 1A is a side view of a device for selecting colours by means of a rotating coloured filter according to the prior art.
Figure 1B:
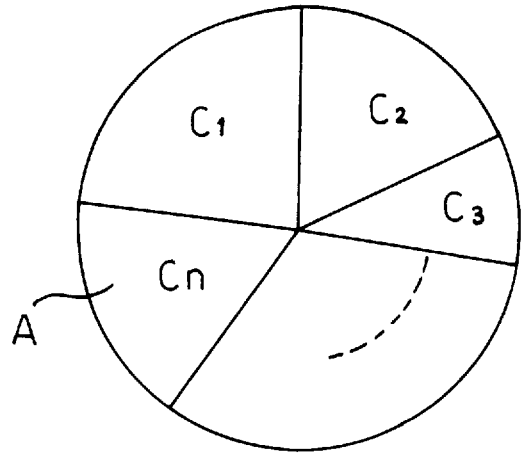
FIG. 1B is a front view of the device of FIG. 1A, FIG. 2 diagrammatically shows a device for selecting colours by means of liquid crystals, according to the prior art.
Figure 2:
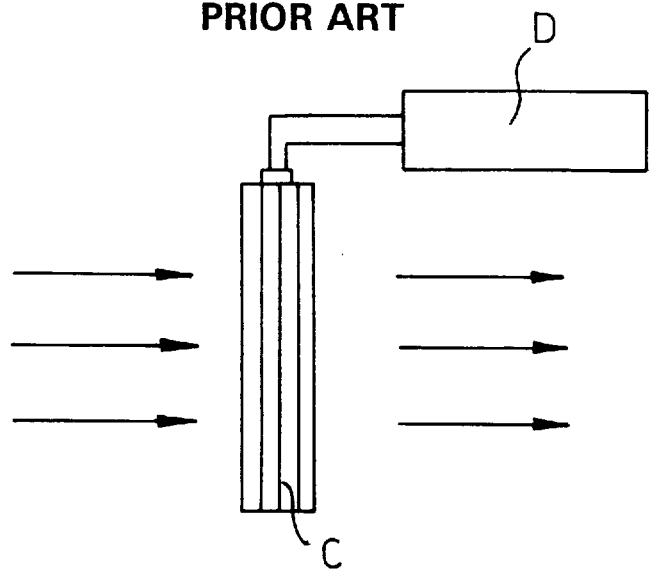

With reference to FIG. 3, a polychromatic light beam 1 is received by a matrix of micro-lenses 2, in which each micro-lens converges the beam portion from which it is intercepted into a plurality of micro-beams which diverge at different angles on a matrix of micro-filters 3, which select the colours or the desired images by means of a movement of the micro-filter matrix with respect to the micro-lens matrix, caused by an actuator device 4 driven by a control unit 5. The size of micro-filters 3 is such that the area of each micro-lens 2 is covered by a plurality of micro-filters 3. For example, if one micro-lens is square in shape with a side L, square micro-filters with a side L/N, where N>2 integer or rectangular micro-filters with sides L and L/N may be used. The illustrated example in FIGS. 3, 4 relates to the case of square micro-filters with N=2, so that to each micro-lens there correspond $N^2=4$ filters, of which for example three are of red, green and blue colour and the fourth is totally transparent, as shown in FIG. 4 where these micro-filters have been designated respectively by letters R, G, B and T.

More generally, if the micro-lens has a non rectangular cross-section, the micro-filters have corresponding shape and size. The distance between the micro-filters and the micro-lenses (FIG. 4) is such that the beams focused by the micro-lenses have a size smaller than that of the intercepted micro-filter, even considering non collimation of the polychromatic beam incidents on the micro-lenses and the residual chromatic aberration in each micro-beam.

In the case of a matrix composed of K×M micro-lenses, we may indicate the matrix with $A_{K,M}$ and the single micro-lens may be identified by the term $a_{ij}$, where i=1, 2, . . . K and j=1, 2, . . . M. If all micro-lenses are identical, for example rectangular in shape with size L×H and the micro-filter matrix is composed of rectangular elements of L/N and H/S size, we may represent the single micro-filter of the micro-filter matrix with the term $(f_{a,b})$i,j where indexes i, j indicate the corresponding micro-lens, where a=1, 2, . . . N; b=1, 2, . . . S.

Each micro-lens generates two or, more generally, P micro-beams with a total number of P×K×M micro-beams. Each micro-lens cooperates with N×S micro-filters. If P=1, the micro-filter which intercepts the luminous beam focused by a micro-lens may be selected in one of the possible N×S positions. The K×M micro-lenses generate a number of K×M beams which intersect a number of K×M identical or different micro-filters. If the micro-filters which have the same indexes a, b are identical to each other, than to each position there corresponds a colour of the light beam. Viceversa, multi-colour beams or coloured images composed by K×M cells (pixels) may be generated. In this case, the N×S possible images can be used to generate animation effects. N×S images can be displayed or projected one at a time.

If P>1, two or more images can be selected simultaneously without moving parts. Each image is seen or projected at different angles. A generalization of the above discussion lies in the use of an optical element on which the filters or images are recorded according to gradual variations rather than in discrete or digital form.

The polychromatic light beam described in FIG. 3 may be generated by any means such as a discharge, neon, incandescence, semi-conductor, solid-state, polymeric, fluorescence or gas source. The beam can be further partially or totally corrected in its vercency by an optical system which operates in free propagation or with wave guides exploiting reflection phenomena, or according to the known methods which operate in refraction, total inner reflection, diffraction or combinations thereof.

Figure 5:
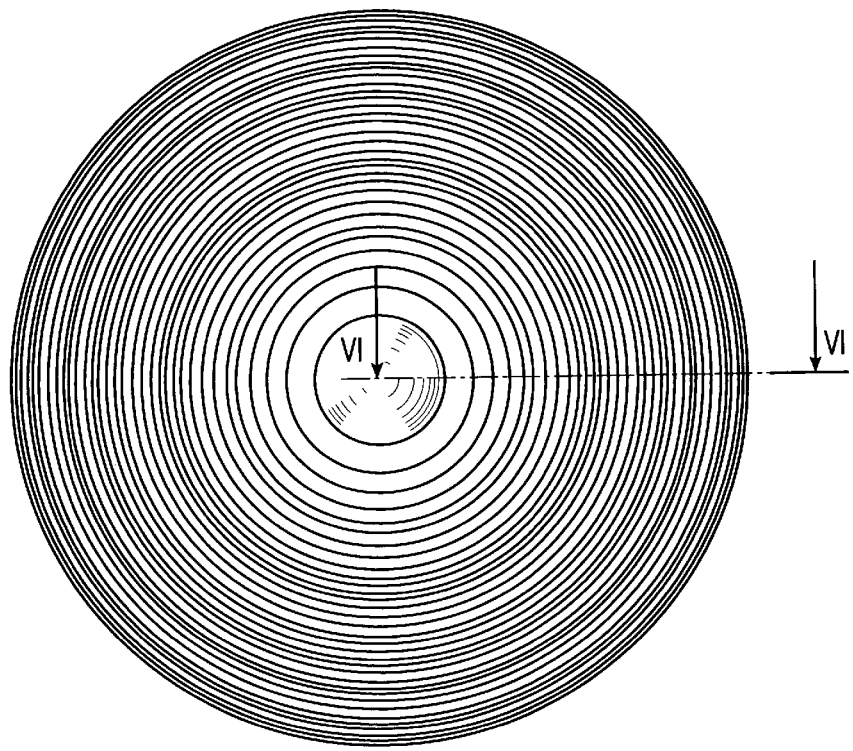
FIGS. 5, 6 are respectively a front view and a partial view in cross-section, according to line V–V of FIG. 5 of a micro-lens able to generate three different polychromatic beams; the correction of the chromatic aberration is effected by combining the effects of a continuous focusing surface and a diffractive grating surface which has also the function to devide the beam in a plurality of beams on the optical axis of each micro-lens.
Figure 6:
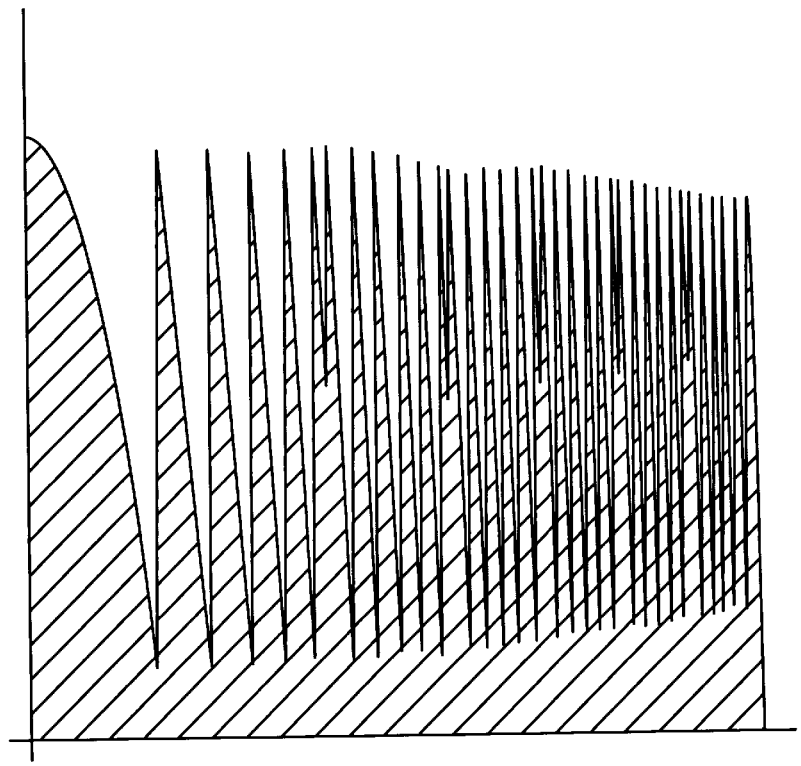

The micro-lens matrix can be composed of refractive, diffractive, diffractive-refractive ibrid lenses, or with radial or volume variation of the refraction index. The base material of the micro-lens matrix can be plastic or glass and provided with antireflective coatings of the thin-film or diffractive type, in order to improve the efficiency of the transfer of the light beam. The transmission function of each micro-lens is constituted by the combination of a spherical (or a-spherical) lens and a unidimensional or bidimensional diffraction grating. An example of lenses of this type is shown in FIGS. 5, 6. The chromatic aberration is corrected by the combination of the focusing refractive surface and the beam separating diffractive surface. The two surfaces are compensated with each other by introducing chromatic aberration. The chromatic aberration is not a limiting factor since the final selection of the colour is carried out by the micro-filter.

Figure 8:
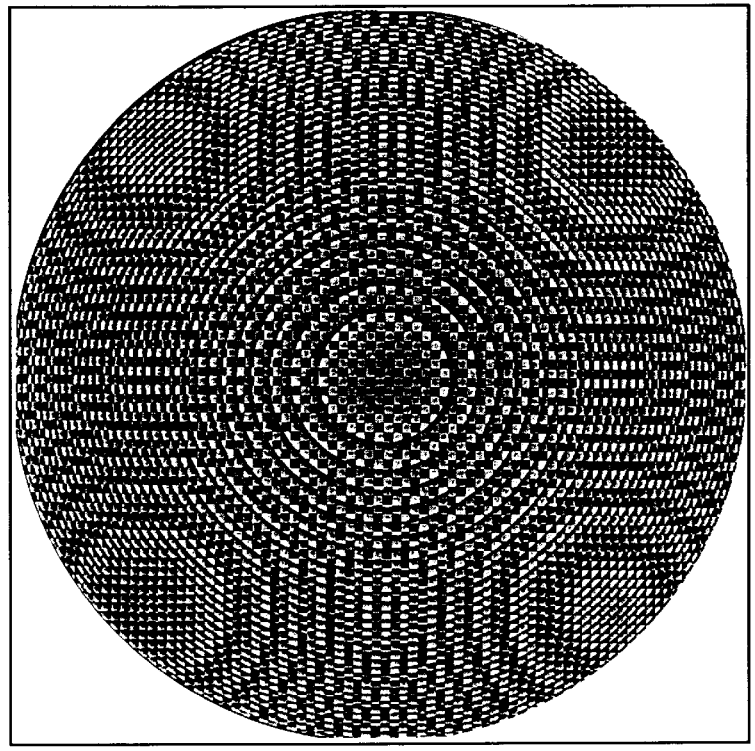
FIG. 8 is a front view of a further lens which focuses the incident polychromatic beam in points arranged at the apices of a square.
Figure 9:
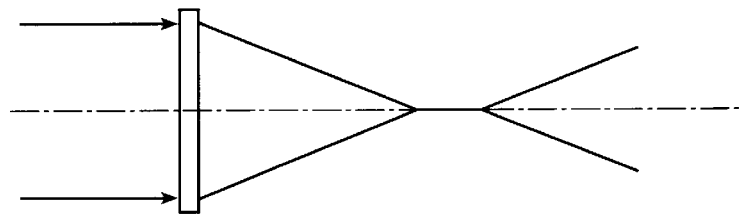
FIG. 9 is a diagrammatic side view of the lens of FIG. 8, FIGS. 10, 11, 12 are diagrammatic side views which shows three different embodiments of the device according to the invention.

Other examples of micro-lenses which can be used for example in systems for projecting images are shown in FIG. 7 (multi-focal lens with three focuses on the optical axis) and in FIGS. 8, 9 (multi-focal lens with four focuses on the same focal plane).

The single micro-lens may have a rhomboidal, hexagonal, rectangular or square cross-section as shown in FIG. 4, with phase function of a spherical or a-spherical lens or more generally able to generate beams with controlled luminous divergency and distribution by its own properties or in combination with the adjacent micro-lenses due to diffractive or combined diffractive-refractive effects.

The micro-filters interposed between the screen and the micro-lenses in proximity of the focuses of the latter provide to locally select the colours of the projected patterns or the images.

Figure 10:
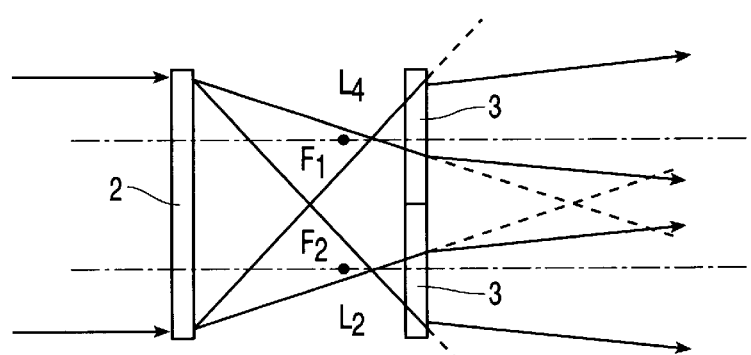
Figure 11:
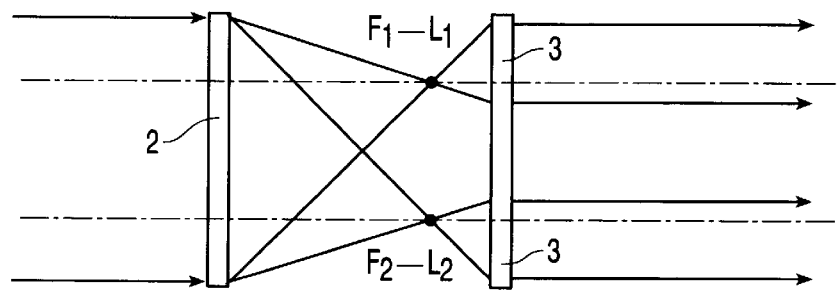
Figure 12:
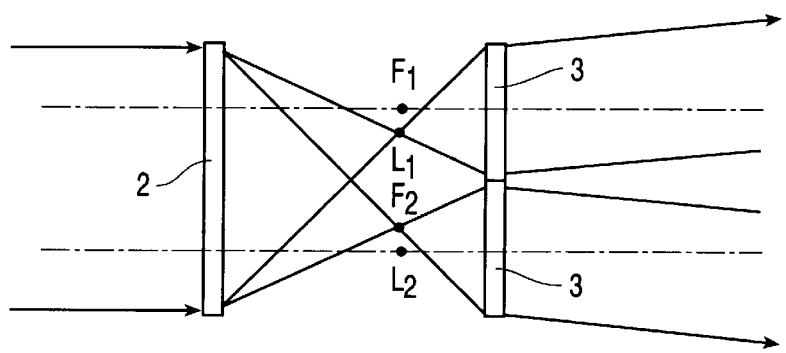

To the intensity distribution and the vergency of the luminous beam may contribute also the micro-filters if they are provided with a curvature so that they behave on their turn as micro-lenses as shown in FIGS. 10, 11, 12. In FIG. 10 the micro-lenses have focuses $L_1$, $L_2$ which are located on the optical axes of the micro-filters 3, but spaced apart from the focuses $F_1$, $F_2$ of the micro-filters, contrary to what happens in the case of FIG. 11, where the focuses are coincident. FIG. 12 shows instead the case in which the focuses $L_1$, $L_2$ of the micro-lens are spaced from the optical axis of the micro-filters 3.

The configuration described in FIG. 3, which uses the beam separating micro-lenses as the first matrix, enables the selection of two or more identical or different images, recorded on the micro-filter matrix, simultaneously.

Figure 13:
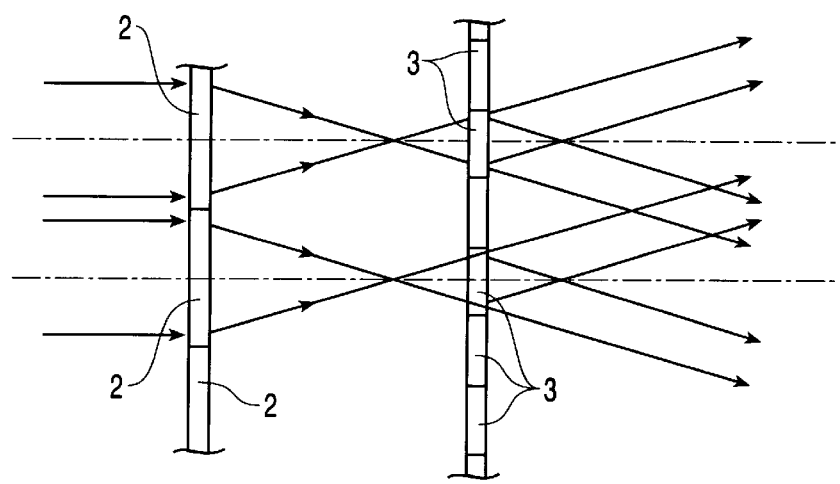
FIG. 13 shows a further variant of the device according to the invention in which the micro-filters are replaced by coloured micro-cells each of which is able to divide the incident beam in many light beams, to project the selected image in many directions simultaneously.

Viceversa, the configuration of FIG. 13, where each micro-lens 2 of the micro-lens matrix focalizes in a single beam and a coloured micro-cell matrix has also the function to divide each incident beam into a plurality of beams, may only provide for the selection of a single image at a time, the image being visible or projectable in many directions simultaneously.

Figure 16A:
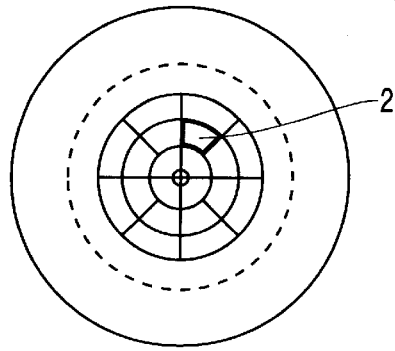
FIGS. 16A, 16B are front views which respectively show a circular micro-lens matrix and a circular micro-filter matrix, rotatable relative to each other around their common axis, for a further embodiment of the device according to the invention.
Figure 16B:
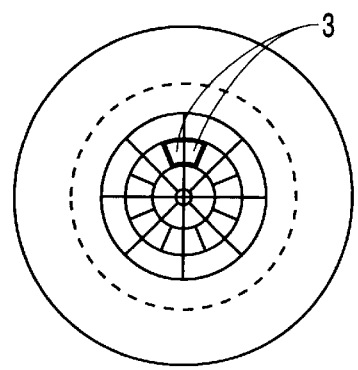

The micro-lenses and the micro-filters may be arranged according to line matrices as shown for example in FIG. 3, or may be arranged on circular matrices as shown in FIGS. 16A, 16B or according to a spiral or in any further arrangement which, by a linear movement, a rotation, an inclination or a combination thereof between the micro-lenses and the micro-filters enables the selection of the light beam or the image coming out from the combination of micro-lenses and micro-filters.

The relative movement between micro-lenses and micro-filters may be applied to the micro-lenses or the micro-filters mechanically, electro-mechanically, by induction or capacitive or electrostatic, piezoelectric, polymeric or similar actuators.

By rapidly activating and deactivating the filters of the primary colours in sequence, one may fool the eye-brain system thus giving the impression that a colour is active which in fact is not included in the filters. As a matter of fact, by controlling the on-status time periods $t_i$ of a single primary colour, the colour perceived may be selected by applying known colourimetry and photometry concepts. As a first approximation, the colour perceived can be expressed by the sum $Rt_1 + Gt_2 + Bt_3$, where R, G, B are the primary colours and $t_i$ is the exposure time of the colour.

Figure 14A:
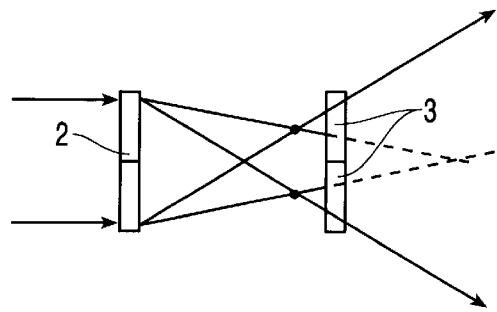
FIGS. 14A, 14B and 14C are a diagrammatic side view of an embodiment of the device according to the invention, a front view of the micro-lens matrix used therein and a front view of the micro-filter matrix used therein.
Figure 14B:
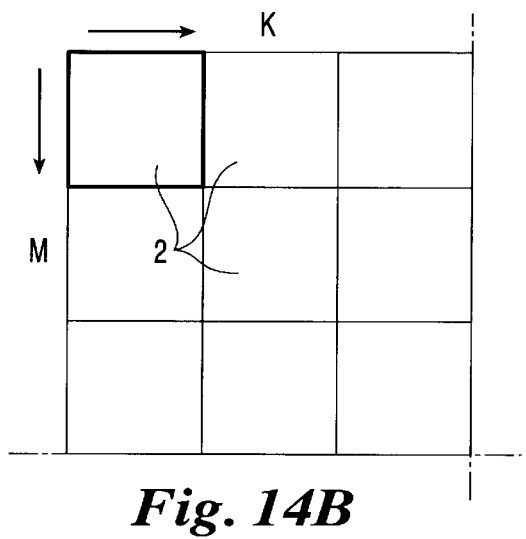
Figure 14C:
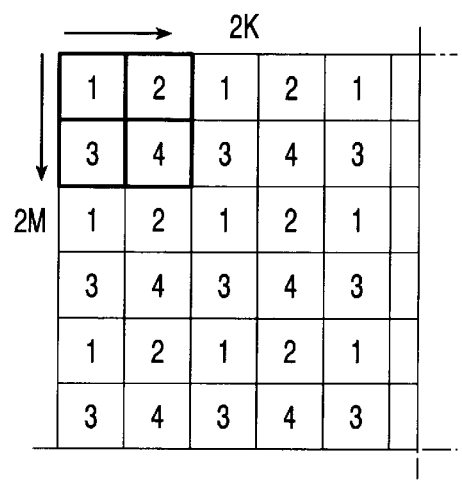

In FIGS. 14A, B, C there is shown a system for displaying four static images. A matrix of K×M square micro-lenses 2 of size L is followed by a matrix of square micro-filters with side L/2. The area of each micro-lens has four corresponding micro-filters of different or identical colours. On the micro-filter matrix (FIG. 14C) there are recorded four images of K×M cells (pixels) whose colours may be all identical to generate mono-chromatic images or images of any colour to generate polychromatic images. Each micro-lens of the first matrix generate two polychromatic micro-beams which select two of the four micro-filters, for example the micro-filters designated by 1 and 2. The images are selected in pairs simultaneously and are displayed or projected at different angles by applying a relative movement between micro-filters and micro-lenses. The animation effect may be easily generated by selecting in sequence slightly different images according to methods known in the field of cartoons.

In general, in devices of this kind, if the coloured micro-filters are also diffusers, the images are visible clearly even looking at the plane of the micro-filters from a great incidence angle. Viceversa, if the micro-filters transmit the light beams without diffusing light, the angle at which the images can be seen on the plane of the coloured micro-filters is defined by the numeric aperture of the micro-lenses. This latter case is of particular interest each time that the viewing angle must be limited. Examples of application are the traffic signals and the warning lights on board a vehicle.

Figure 15:
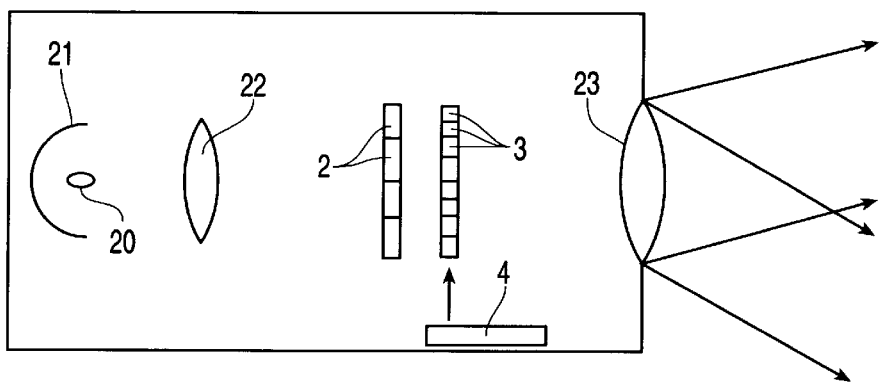
FIG. 15 is a diagrammatic side view of an example of the application of the invention to an image projector with reference to an example of a multi-image diapositive and a multi-screen.

FIG. 15 diagrammatically shows a device for projecting images or light patterns having a predefined cross-section. The light beam emitted by a source 20 reflected by a reflector 21 passes through a lens 22 and than through the device according to the invention, including the matrix of micro-lenses 2 and the matrix of micro-filters 3 controlled by an actuating device 4 for causing the movement, until it reaches an objective 23 whose function is to project the luminous pattern coming out of the micro-filters on a screen. In the most general case, the device operates as a modified diapositive projector in which a matrix of micro-lenses operating according to the principle described in FIGS. 5, 8 and the diapositive (or micro-filter matrix) has recorded on its whole area a plurality of images which can be selected one by one or two by two or in any greater number simultaneously by applying a relative movement between micro-filters and micro-lenses.

From the foregoing description it is clearly apparent that, according to the invention, the radiation beam emitted by a polychromatic source of finite dimension is initially corrected in its vergency and distribution by a reflector or a system which operates according to the phenomena of refraction, diffraction or total inner reflection, strikes on an array of micro-lenses with square or rectangular shape or with arbitrary cross-section which have the function to converge and divide the beam into a plurality of partial beams which may have different directions towards a matrix of coloured micro-filters or images.

The micro-filters or the cells corresponding to different images are two, or more than two, for each single micro-lens present in the micro-lens matrix. The size of the coloured micro-filters is such that they intersect partially or totally the converging polychromatic beam. The selection of the colour of the images is obtained by interposing the desired colour in the polychromatic light beam. A movement of the micro-filter base plate enables the colour or image to be changed. The cross-section of the filters and the type of lenses which are used enable coloured patterns with desired luminous distribution to be generated.

Naturally, while the principle of the invention remains the same, the details of construction and the embodiments may widely vary with respect to what has been described and illustrated purely by way of example, without departing from the scope of the present invention.

What is claimed is:

1. Device for the selection of colours or images in a light beam, comprising:

a light beam generator, an array of micro-lenses integrated in a thin and transparent plate, each able to generate at least one partial beam, an array of coloured micro-filters or image micro-cells having size and cross-section adapted to the size and the cross-section of said micro-lenses, and an actuating device to apply a relative movement between the two arrays of micro-lenses and micro-filters or image micro-cells, so as to obtain a luminous pattern at the output, which is selected among various possible patterns different in shapes colour and vergency.

2. Device according to claim 1, wherein the micro-lenses and the micro-filters or micro-cells are arranged according to a matrix comprised of at least one of a circle pattern and a spiral pattern such that the relative movement of micro-lenses and micro-filters enables the type of pattern recorded on the micro-filters or image micro-cells to be selected.

3. Device according to claim 1, in which the micro-lenses are constituted by a matrix of K×M converging micro-lenses having a rectangular cross-section with sides L, H and the micro-filters or micro-cells are in number of N×S with sides L/N, H/S, where K, M, N, S are integers.

4. Device according to claim 3, in which each micro-lens is able to generate P partial micro-beams, with P>1 so that the total number of partial micro-beams is P×K×M.

5. Device according to claim 3, wherein each micro-filter or micro-cell is able to generate P partial micro-beams, with P>1.

6. Device according to claim 1, wherein it has a matrix of square micro-lenses, each cooperating with a matrix of four micro-filters each having a side which is one half of the side of each micro-lens.

7. Device according to claim 1, wherein it is provided with means for generating animated images by selecting images slightly different from each other in sequence, according to methods known in the field of cartoons.

8. Device according to claim 1, in which said micro-lenses are able to control the shape, the cross-section, the vergency and the direction of the light beam, whereas the micro-filters are able to select the colour of the single partial beam.

9. Device according to claim 1 wherein it constitutes a part integrated in a lighting system of a motor-vehicle.

10. Device according to claim 1 wherein it is used as a traffic light in which colours, direction signals, flashing effects are obtained with a single source.

11. Device according to claim 1, used in a traffic signal, wherein beyond the selection of a signal, the angular viewing direction may also be selected, said device enabling different images to be seen simultaneously from different directions.

12. Device according to claim 1, wherein it is provided in form of an advertising panel or a luminous sign.

13. Image projector using an objective for focusing on a screen, comprising a device according to claim 1, said projector including a matrix of micro-lenses and a matrix of micro-filters or diapositives which have a plurality of images recorded on their whole area, a selection of images being obtained by applying a relative movement between the diapositive, or micro-filter matrix, and the micro-lens matrix able to generate two or more partial micro-beams.

14. Device according to any of the previous claims, wherein the micro-lenses are able to generate a plurality of partial beams which totally or partially intersect the micro-filters or micro-cells of a colour located in the vicinity of the focus of the micro-lenses.

* * * * *